United States Patent Office 2,919,248
Patented Dec. 29, 1959

2,919,248

DISUBSTITUTED CARBAMIDE DETERGENT COMPOSITION

Lloyd I. Osipow, Monsey, and William C. York, Westbury, N.Y.; Ruth M. York, administratrix of said William C. York, deceased, assignors to W. R. Grace & Co., a corporation of Connecticut No Drawing. Application June 5, 1957
Serial No. 663,579

10 Claims. (Cl. 252—137)

This invention relates to detergent compositions. In one specific aspect, it relates to combinations between common detergent builders and monoacyl derivatives of disubstituted carbamides. In another aspect, it relates to novel built detergent compositions containing fatty acid monoesters of diglucose ureide.

In our copending application Ser. No. 663,580, filed June 5, 1957, now U.S. Patent No. 2,903,445, we have disclosed a novel class of chemical compounds characterized by the structural formula:

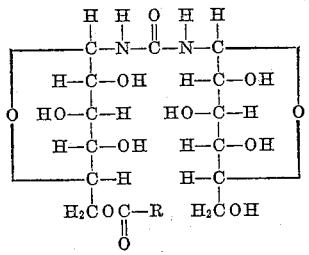

In the above formula, R is a hydrocarbon residue of the formula $C_nH_m$ where $n$ is an integer of at least 7 and not more than 23 and $m$ is an integer in the range between $2n-3$ and $2n+1$ inclusive. Thus, R is an alkyl, alkenyl or alkadienyl radical having from 7 to 23 carbon atoms. It is obvious that the product of the above formula is the same whether the acyl moiety is substituted on the 6 or 6' position. Generically, our new compounds are described as the monofatty acid esters of diglucose ureide. Typical novel diglucose ureide esters embraced by the present invention include the caprylate, pelargonate, caprate, undecanoate, laurate, tridecanoate, myristate, pentadecanoate, palmitate, margarate, stearate, nonadecanoate, arachidate, heneicosanoate, behenate, tricosanoate, lignocerate, oleate, palmitoleate, petroselinate, erucate, linoleate, eleosterate, and the like. Suitable esters also include mixtures of those enumerated hereabove. For example, the diglucose ureide esters of coconut oil, palm oil, tall oil, olive oil, soybean oil and tung oil are also useful.

Our novel compounds are prepared by a new alcoholysis reaction between diglucose ureide and an ester of a fatty acid of the general formula:

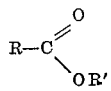

R has the meaning hereinbefore described. R' is an organic moiety. In a preferred embodiment, R' is a lower alkyl radical; i.e., up to and including hexyl. The lower alkyl esters of the fatty moieties of the above formula are suitable for the alcoholysis reaction, since they result in the formation of an alcohol sufficiently volatile to permit its removal from the mixture by simple distillation as the reaction progresses. Since alcoholysis is an equilibrium reaction, it follows that some diglucose ureide monoester is formed whether or not the by-product alcohol is separated. Thus, any organic ester of a fatty acid is suitable in the present process including those such as glycerides which are less volatile than the solvent selected for the reaction medium. The impediment to rapid reaction is the removal of the alcohol. Consequently, the reaction is faster if a more volatile alcohol is used. Under the preferred conditions of temperature and pressure, the alcohol can be conveniently stripped free of the reaction mixture by using reduced pressure to aid distillation of the alcohol therefrom or by blowing an inert gas through or over the suface of the reaction mixture.

Suitable solvents for the novel alcoholysis reaction are those which will dissolve both diglucose ureide and the starting ester without preferential reaction with either of the products or the reactants. In the preferred embodiment we use dimethylsulfoxide or monomethylformamide.

The novel reaction is effectively catalyzed by an alkaline catalyst. By the term "alkaline catalyst" we mean a basic organic salt or a salt of a metal selected from groups I, II, or IV of the periodic table and a weak acid. Proton-accepting metals such as tin and zinc are also embraced by the term "alkaline catalyst." Likewise, quaternary ammonium bases and similar compounds are effective for this purpose. Exemplary catalysts include sodium hydroxide, potassium hydroxide, sodium carbonate, sodium methoxide, potassium ethoxide, trisodium phosphate, lithium hydroxide, magnesium hydroxide and lead oxide.

Specific working examples for the preparation of the individual diglucose ureide esters are given later in the specification. The diglucose ureide monofatty esters made by this process are effective as cleaning agents per se. We have discovered that these novel esters form synergistic combinations with common builders to produce superior detergents.

It is well known, of course, to combine a surface active agent possessing good detergent properties with an alkali salt of a weak inorganic acid, a neutral inorganic salt, e.g. an alkali metal salt of a strong inorganic acid, and a deflocculating agent to produce a detergent composition. However, the effectiveness of a particular composition depends upon balance between the above ingredients and furthermore, the synergistic interaction between the active agent and the building materials. We have discovered such an improved combination. The diglucose ureide mono-fatty ester detergents, when combined in proper portion with building materials, form a truly superior detergent composition which is astonishingly effective both in hard and soft water. The basic composition may be varied to provide novel detergent compositions effective for both light duty and heavy duty purposes.

It is, therefore, an object of the present invention to provide novel detergent compositions which represent a marked improvement in the field of nonionic built detergents.

For the purposes of our novel composition, we have found it especially desirable to incorporate a major portion of inorganic water soluble phosphates. Phosphates which are suitable include, but are not limited to, sodium tripolyphosphate, tetrasodium pyrophosphate, trisodium orthophosphate and sodium hexametaphosphate. In preparing our heavy duty detergent compositions we prefer to use a substantial portion of sodium tripolyphosphate. For heavy duty detergency the percentage of inorganic phosphates in the composition may vary from about 10 to 80%. We find that the preferred range is about 30–60%. Within this range optimum effect is achieved between the phosphate ingredient and our novel diglucose ureide ester. Alkali metal silicates also are effective as building materials for the purposes of the present invention. Suitable compounds within this category include sodium silicate and sodium metasilicate pentahydrate. The silicates in solution undergo hydrolysis to give a pH of about 11.2. In our compositions we may have from about 5–25% of the alkali metal silicate although the preferred quantity is from about 10–15%. A sodium salt of a strong inorganic acid is an important building material for our novel detergent compositions. Such a salt does not hydrolyze but it dissociates to a sufficient extent to provide sodium ion in the detergent solution. For a light duty detergent where a less alkaline medium is desired we find that sodium sulfate in quantities from about 50–85% is desirable. 5–30% of this material is generally incorporated in our novel heavy duty detergents. A small quantity of an alkali metal carbonate such as sodium carbonate is also desirable as a building material. While the diglucose ureide monoesters tend to act per se as dispersants or deflocculents, we have found that it is desirable to bolster their natural propensity to defflocculate by the addition of a minor portion ranging from about 0.5 to 2% of sodium carboxymethyl cellulose.

The amount of diglucose ureide monoester in the detergent composition in generally minor in proportion to the weight of the builders. Generally, the proportion of the monoester to the builders ranges from about 1:49 to about 1:1. Under preferred conditions the novel urea detergent comprises from about 15–30% by weight of the total composition. The optimum amount of this active ingredient will vary according to the specific building materials, the contemplated field of application, and the manner of use.

The general procedures for preparing our novel compositions are as follows. The builders may be added to the urea detergent to form a hot aqueous slurry containing from about 40–60% solids concentration. This mixture is vigorously stirred to form a smooth and homogeneous paste. To form the slurry, the additives may be dissolved in a suitable solvent and added to a slurry of the monoesters, or alternatively, a mixture or emulsion of the builders in water with a minor portion of the urea detergent may be put simultaneously into the slurry. The builder may also be incorporated in the detergent composition by a post treatment of dried detergent particles.

Thereafter these compositions may be prepared in forms of solutions, pastes, or as dry, partially hydrated solid products, preferably in a finely divided condition. If a solution of the detergent composition is prepared it may be subjected to suitable drying operations and converted into particulate form. The mixture may be then spray dried, drum dried or roll dried at temperatures of about 200°–350° F.

In order for a composition to be an excellent detergent, it must have (1) ability to wet and spread on liquid and solid surface, (2) ability to form a stable foam, (3) ability to emulsify oily materials, (4) ability to peptize aggregates of solid particles and (5) ability to deflocculate or stabilize disperse systems of solid particles. The novel diglucose ureide monoesters possess these characteristics to a measurable extent. However, as an active agent in the detergent compositions described hereabove, these desirable properties of the urea detergents are considerably enhanced. The effectiveness of the novel monoesters as part of a composition is further discussed in connection with the standard commercial detergent evaluation tests which appear in the examples infra. We have observed a tendency of the alkaline building material to cause saponification by a cleavage of fatty esters within the detergent solutions during use. The soap thus formed is disposed of within the soil which is being removed by the detergent. Builders by themselves are not particularly effective emulsificants. The presence of the novel diglucose ureide esters and the saponification products resulting from chemical reaction within the detergent solution causes our novel built compositions to have superior emulsification properties. This is especially important in carrying away the water insoluble inert organic materials such as hydrocarbon oils, asphalt and tar from the surface of the material to be cleaned. The ability to disperse and defflocculate soil particles possessed by our novel esters is supplemented by the presence of sodium carboxymethyl cellulose in our novel heavy duty detergents. Because of this property our novel compositions effectively sequester calcium and magnesium ions in hard water and prevent redeposition of their soaps on the surface of the material being treated.

The scope and utility of the present invention is further illustrated by the following examples.

EXAMPLE I

A detergent composition was prepared by forming a 60% solids slurry containing on a solids basis about 40% of sodium tripolyphosphate, about 10% tetrasodium pyrophosphate, about 10% sodium metasilicate pentahydrate, about 19.5% sodium sulfate, about 20% diglucose unreide laurate and about 0.5% sodium carboxymethyl cellulose. This slurry was vigorously agitated at about 140° F. to form a homogeneous mixture. It was then dried with heated air at a temperature of about 350° F. with the resultant moisture loss of about 40%. The resulting composition was recovered as a powder which possessed a high grade of detersive and foaming properties in both hard and soft water. The resulting detergent is remarkably effective for heavy duty, viz: treating e.g. soiled cotton.

EXAMPLE II

The procedure of Example I was substantially repeated using various diglucose ureide monoesters to form the compositions. Built detergents containing diglucose ureide myristate, cocate, palmitate, oleate, stearate, and tallowate were thus prepared.

EXAMPLE III

A detergent composition was prepared by the procedure of Example I using about 25% diglucose ureide laurate and about 75% sodium sulfate on a solids basis. The resulting detergent is extremely effective for light duty, viz: treating, e.g. soiled wool.

EXAMPLE IV

The procedure of Example III was substantially repeated to form light duty detergents containing about 25% of the following active agents: diglucose ureide myristate, cocoate, palmitate, oleate, stearate, and tallowate.

EXAMPLE V

*Detergency evaluation*

It has previously been indicated that detergency depends upon a variety of factors; viz: wetting power, emulsification, dispersion, and defflocculation. The following experiment was conducted to ascertain the detergent action of the novel diglucose ureide esters in a built detergent system.

A sample of "Foster D. Snell" soiled cotton was selected for the evaluation of the heavy duty detergents. This test sample was prepared by treating de-sized Indian Head cotton fabric in a soiling mixture containing 28.4% carbon, 35.8% coconut oil, 17.9% coconut oil fatty acids and 17.9% mineral oil suspended in carbon tetrachloride. The Indian Head cotton fabric was dipped into the suspension, air dried, rinsed lightly in water to remove loosely adherent soil. It was again air-dried. A test sample of Foster D. Snell soiled wool, selected for evaluation of the light duty detergents, was prepared as follows: Sheets of Botany Mills virgin wool were scoured in a washing machine at 43° C. for 15 minutes using an aqueous solution of a commercial detergent. The wool was thereafter rinsed, using three changes of water with constant agitation for 15 minutes at 43° C. for each change. A standard soiling mixture was prepared by homogenizing 17 g. of a standard soil (comprising 7.3 parts coconut oil fatty acids, 146 parts of coconut oil, 146 parts of deflocculated graphite and 1.1 parts of commercial detergent) in 50 ml. of water. The soil emulsion was dispersed in 3 liters of water; it was then added to a washing machine containing 23 sheets of the scoured rinsed wool and 10 gallons of water at 43° C. Ten minutes after the soil was added the machine was stopped and the water was allowed to drain off. The soiled wool was rinsed once for 5 minutes with 10 gallons of water at 43° C. and then hung up to dry in a dust-free room. The composition of the built detergents prepared according to the procedure of the foregoing examples is shown below in Table 1.

TABLE 1.—COMPOSITION OF BUILT DETERGENTS

|  | Type of Building | |
| --- | --- | --- |
|  | A | B |
|  | Percent | Percent |
| Active agent | 20.0 | 25.0 |
| Sodium tripolyphosphate | 40.0 | |
| Tetrasodium pyrophosphate | 10.0 | |
| Sodium metasilicate pentahydrate | 10.0 | |
| Sodium sulfate | 19.5 | 75.0 |
| Sodium carboxymethyl cellulose | 0.5 | |

Detergents were compared by running simultaneous wash tests in a Launderometer. This machine rotates twenty jars end-over-end in a bath of fixed temperature. In each jar are placed standard soiled cloths, wash solution and rubber balls to provide "load." The test method gives useful comparative results provided, of course, that the detergents to be compared are run simultaneously and portions of the same batch of standard cloth are used. For check runs, the same series is repeated a second time and a third time. The values for each detergent can be averaged and incidental variables will largely cancel out when the averages are compared. Such a system is called a group experiment. The test conditions used with heavy duty detergents are shown below in Table 2.

TABLE 2.—TEST CONDITIONS

Amount of solution per jar _____ 100 ml.
Mechanical washing assistants _____ 8 rubber balls ⅝" diameter.
Temperature _____ 60° C.
Speed of rotation of jars _____ 40 r.p.m.
Time for washing _____ 15 minutes.
Rinsing procedure _____ Rotate two minutes with 150 ml. of water of same hardness as wash water.
Fabrics per jar _____ Two swatches of "FDS" soiled cotton 3 x 2 inches.
Reflectance reading _____ By Hunter multipurpose reflectometer set to read 100 on magnesia block.

Detergents for light duty were tested using the above procedure substituting "FDS" soiled wool for the cotton and reducing the temperature to 43° C.

The esters of diglucose ureide were compared with a polyoxyethylene ester of tall oil, a nonionic detergent sold commercially as "Sterox CD," which is commonly built for heavy duty household uses, and t-octylphenol- polyether alcohol, a detergent sold commercially as "Triton X–100." Detergency data were obtained in both hard water of a hardness equivalent to 15 grains of calcium carbonate per gallon and soft water of a hardness equivalent to 2 grains per gallon. A U.S. grain of hardness is equivalent to 17.1 parts per million of calcium carbonate. Results for both heavy duty and light duty detergency evaluation appears below in Tables 3 and 4.

TABLE 3.—DETERGENCY EVALUATION

[Soiled cotton washed at 60° C.]

| Active Agent | Type of Building | Gain in Reflectance Units of Soiled Fabrics after Washing in Launderometer | | | |
| --- | --- | --- | --- | --- | --- |
| | | 2-Grain Water Detergent concentration | | 15-Grain Water Detergent concentration | |
| | | 0.25% | 0.35% | 0.25% | 0.35% |
| Diglucose ureide laurate | A | 14.7 | 18.2 | 11.9 | 14.6 |
| Diglucose ureide myristate | A | 15.0 | 17.3 | 12.9 | 15.6 |
| Diglucose ureide cocoate | A | 18.4 | 19.4 | 14.0 | 17.4 |
| Diglucose ureide palmitate | A | 15.0 | 17.6 | 14.9 | 17.4 |
| Diglucose ureide oleate | A | 15.6 | 17.6 | 15.3 | 15.8 |
| Diglucose ureide stearate | A | 13.1 | 15.5 | 13.6 | 15.4 |
| Diglucose ureide tallowate | A | 14.7 | 17.8 | 15.1 | 16.7 |
| Polyoxyethylene ester of tall oil | A | 2.5 | 4.4 | 3.8 | 4.2 |
| t-Octylphenyl polyether alcohol | A | 8.0 | 8.9 | 9.5 | 9.3 |

TABLE 4.—DETERGENCY EVALUATION

[Soiled wool washed at 43° C.]

| Active Agent | Type of Building | Gain in Reflectance Units of Soiled Fabrics after Washing in Launderometer | |
| --- | --- | --- | --- |
| | | 2-Grain Water Detergent Concentration | 15-Grain Water Detergent Concentration |
| | | 0.3% | 0.3% |
| Diglucose ureide laurate | B | 6.1 | 6.6 |
| Diglucose ureide myristate | B | 9.4 | 8.9 |
| Diglucose ureide cocoate | B | 9.3 | 7.4 |
| Diglucose ureide palmitate | B | 8.4 | 9.9 |
| Diglucose ureide oleate | B | 10.6 | 9.3 |
| Diglucose ureide stearate | B | 8.3 | 8.6 |
| Diglucose ureide tallowate | B | 9.5 | 9.8 |
| Polyoxyethylene ester of tall oil | B | 3.2 | 2.9 |
| t-Octylphenol polyether alcohol | B | 8.5 | 9.5 |

It is readily seen from the above tables that the diglucose ureide fatty acid esters are comparable to or superior to standard commercial detergents when built for both light and heavy duty detergency. In fact, they are markedly superior as heavy duty detergents. For light duty, the diglucose ureide oleate is exceptional among the compounds tested. Data also indicate that our novel built detergents are effective in both hard and soft water.

Specific examples for the preparation of the various diglucose ureide esters referred to herein now follow.

EXAMPLE VI

*Diglucose Ureide Laurate*

A reaction apparatus was assembled by equipping a 3-necked flask with a stirrer and a 10-bulb fractionating column leading to a receiver. This flask was charged with 1.5 liters of dimethyl sulfoxide, 384 g. (1 mole) of diglucose ureide and 71 g. (0.33 mole) of methyl laurate. The solution was heated to 90° C. under a pressure of 15 mm. Hg absolute for one hour to remove any moisture that may have been present. A 7 g. portion of potassium carbonate was added. The solution was then heated with stirring at 90° C. for 12 hours under a pressure of 15 mm. Hg absolute. After the first 6 hours of reaction, approximately 700 ml. of distillate had been collected. A 700 ml. portion of fresh dimethyl sulfoxide was added to the reaction mixture and distillation was continued for an additional 6 hours.

The solution was cooled, neutralized with acetic acid and filtered to remove a small quantity of diglucose ureide which precipitated during the cooling process. The clear filtrate, approximately 900 ml., was diluted with 1 liter of butanol and 1 liter of concentrated saline solution. The butanol layer was decolorized with activated carbon and distilled to a thick residue. This residue was dissolved in 400 ml. of hot ethanol. The solution was then cooled and diluted with 1 liter of acetone. The resulting solution was chilled to minus 10° C. to precipitate 68 g. of product. One recrystallization of this material from ethanol gave a product containing 4.6% nitrogen. The structural formula of the diglucose ureide laurate is shown hereunder:

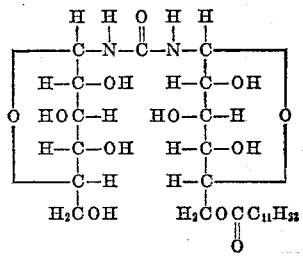

EXAMPLE VII

Diglucose Ureide Myristate

The procedure of Example VI was substantially repeated using 81 g. (0.33 mole) of methyl myristate in lieu of the methyl laurate. A 60 g. yield of diglucose ureide myristate was thereby obtained.

EXAMPLE VIII

Diglucose Ureide Palmitate

The procedure of Example VI was substantially repeated using 90 g. (0.33 mole) of methyl palmitate in lieu of the methyl laurate. A 81 g. yield of diglucose ureide palmitate was thereby obtained. This crude material had a specific rotation of $$[\alpha]\frac{22° \text{ C.}}{D} = +19.7°$$

It contained 4.21% nitrogen (theory 4.5%) and 39.76% palmitic acid equivalent (41.0%) after purification by absorption chromatography. The novel product thus purified was found to have a melting point of 205–208° C. and a specific rotation of $$[\alpha]\frac{22° \text{ C.}}{D} = +17.29°$$

in dimethyl sulfoxide.

EXAMPLE IX

Diglucose Ureide Stearate

The procedure of Example VI was substantially repeated using 100 g. (0.33 mole) of methyl stearate in lieu of methyl laurate. A 78 g. yield of diglucose ureide stearate was thereby obtained. This crude material had a specific rotation of $$[\alpha]\frac{25° \text{ C.}}{D} = +18.8°$$

It contained 3.85% nitrogen (theory 4.33%) and 32.55% stearic acid equivalent (theory 43.6%). After purification by absorption chromatography the novel product was found to have a melting point of 190–200° C. and a specific rotation of $$[\alpha]\frac{22° \text{ C.}}{D} = +16.61°$$

in dimethyl sulfoxide.

EXAMPLE X

Diglucose Ureide Oleate

The procedure of Example VI was substantially repeated using 100 g. methyl oleate in lieu of methyl laurate. A 75 g. yield of diglucose ureide oleate was thereby obtained. This crude product had a specific rotation of $$[\alpha]\frac{25° \text{ C.}}{D} = +16.4°$$

After purification by absorption chromatography the novel product was found to have a melting point of 160–170° C. and a specific rotation of $$[\alpha]\frac{22° \text{ C.}}{D} = +17.8°$$

in dimethyl sulfoxide.

EXAMPLE XI

Diglucose Ureide Cocoate

The procedure of Example VI was substantially repeated using 81 g. (0.33 mole) of methyl cocoate in lieu of the methyl laurate. A 42 g. yield of diglucose ureide cocoate was thereby obtained. The "cocoate" comprises methyl esters of coconut oil fatty acid containing about 5.4 caprylate, 8.4 caprate, 45.4 laurate, 18 myristate, 10.5 palmitate, 2.3 stearate, 7.5 oleate, 0.8 caproate, 0.4 arachidate, and 0.4% palmitoleate.

EXAMPLE XII

Diglucose Ureide Tallowate

The procedure of Example VI was substantially repeated using 100 g. methyl tallowate in lieu of methyl laurate. A 62 g. yield of diglucose ureide tallowate was thereby obtained. The "tallowate" is a mixture of tallow fatty acid methyl esters containing about 6.3 myristate, 27.4 palmitate, 14.1 stearate, 49.6 oleate, and 2.5% octadecadienoate.

We claim:

1. A detergent composition consisting essentially of from about 2 to 50% of a diglucose ureide monofatty ester and from about 50 to 98% of at least one material selected from the group consisting of an alkaline water soluble alkali metal phosphate and a water soluble alkali metal sulfate.

2. A detergent composition according to claim 1 wherein the diglucose ureide monoester is selected from the group consisting of diglucose ureide laurate, diglucose ureide myristate, diglucose ureide cocoate, diglucose ureide palmitate, diglucose ureide oleate, diglucose ureide stearate and diglucose ureide tallowate.

3. A detergent composition according to claim 1 containing 0.5 to 2% of an alkali metal carboxymethyl cellulose.

4. A heavy duty detergent composition consisting essentially of about 5–30% of a diglucose ureide monofatty ester wherein the acyl moiety attached to the glucose group contains from 8–24 carbon atoms; about 10–80% of an alkaline water soluble alkali metal phosphate, about 5–15% of a water soluble alkali metal silicate, about 15–25% of a water soluble alkali metal sulfate, and from 0.5 to 2% of an alkali metal carboxymethyl cellulose.

5. A light duty detergent composition consisting essentially of from 5–30% of a diglucose ureide monofatty ester wherein the acyl moiety attached to the glucose group contains from 8–24 carbon atoms, and from 70–90% of a water soluble alkali metal sulfate.

6. A detergent composition consisting essentially of 50–98% by weight solids of at least one alkaline water soluble alkali metal phosphate, a water soluble alkali metal silicate, and a water soluble alkali metal sulfate; 0.5–2% of an alkali metal carboxymethyl cellulose; and 2–50% by weight of solids of a diglucose ureide monofatty ester of the general formula:

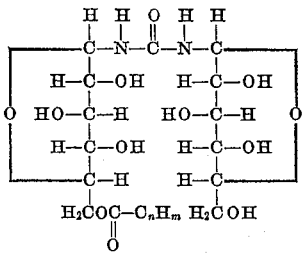

wherein $n$ is an integer having the value of at least 7 and not more than 23 and $m$ is an integer having a value between $2n-3$ and $2n+1$ inclusive.

7. A heavy duty detergent composition consisting essentially of from about 15–25% of a diglucose ureide monofatty ester of the general formula:

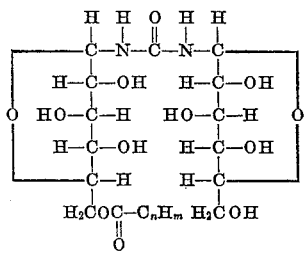

wherein $n$ is an integer having the value of at least 7 and not more than 23 and $m$ is an integer having a value between $2n-3$ and $2n+1$ inclusive, from 35–45% sodium tripolyphosphate, from 5–15% tetrasodium pyrophosphate, from 5–15% sodium metasilicate pentahydrate, from 15–25% sodium sulfate and from 0.5% to 2% sodium carboxymethyl cellulose.

8. A composition according to claim 7 wherein the diglucose ureide monofatty ester is diglucose ureide cocoate.

9. A light duty detergent composition consisting essential of about 20–30% of a diglucose ureide monoester of the general formula:

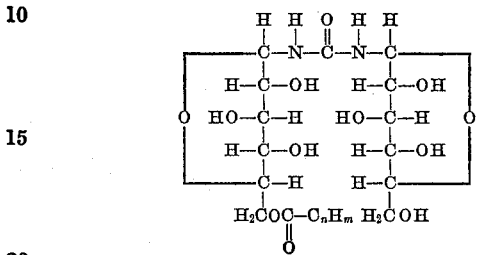

wherein $n$ is an integer having the value of at least 7 and not more than 23 and $m$ is an integer having a value between $2n-3$ and $2n+1$ inclusive, and from 70–80% sodium sulfate.

10. A composition according to claim 9 wherein the diglucose ureide monoester is diglucose ureide oleate.

References Cited in the file of this patent

UNITED STATES PATENTS 2,738,333    Goldsmith _____ Mar. 13, 1956

FOREIGN PATENTS 496,832    Canada _____ Oct. 13, 1953